July 28, 1931.  L. ROBIDOUX  1,816,548
SIMPLIFIED RULE
Filed May 31, 1928

INVENTOR
LOUIS ROBIDOUX
BY
ATTORNEY

Patented July 28, 1931

1,816,548

UNITED STATES PATENT OFFICE

LOUIS ROBIDOUX, OF FLINT, MICHIGAN, ASSIGNOR TO THERESA ROBIDOUX, OF PROVIDENCE COUNTY, RHODE ISLAND

SIMPLIFIED RULE

Application filed May 31, 1928. Serial No. 281,883.

This invention relates to rules and more particularly to graduated rules or scales for measuring linear distances, and is especially adapted for use in scaling fractional dimensions.

In actual practice, especially in machine shops, the machinist or tool maker is quite often required to accurately measure a piece of work, and the work frequently has a dimension of a fraction of an inch, such as 3/32 inches, 5/16 inches or 9/64 inches, etc. Such fractional dimensions are frequently encountered, and it is sometimes difficult to accurately measure such odd fractional dimensions, especially such fractional dimensions in the small units as sixty-fourths.

It is the object of my invention to facilitate the measurement of such fractional dimensions, by providing a rule having a graduated scale impressed or marked thereon, that permits odd fractional dimensions to be more readily and accurately scaled.

A further object of my invention is to provide a single rule, that is provided with various graduations, which permit the accurate scaling of all fractional dimensions within a reasonable limit.

For a more detailed understanding of my invention, reference may be had to the accompanying drawings which illustrate one form which my invention may assume, and in which:—

Figure 1:
Fig. 1 is a plan view of one side of my improved rule showing graduations in eighths and thirty-seconds.
Figure 2:
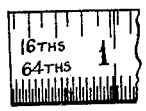
Fig. 2 is a plan view of the reversed side of my improved rule showing graduations impressed or marked thereon in sixteenths and sixty-fourths.

One side of my rule, as illustrated in Fig. 1, shows the rule graduated along one edge into eighths, such as 1/8, 1/4, 3/8, 1/2, 5/8 etc. The opposite edge of the rule or scale is graduated in a novel manner. It will be noted that the graduations begin at 1/32 and are continued so as to scale the odd fractional dimensions, such as 3/32, 5/32, 7/32, 9/32 etc., up to 31/32 and 1, the following unit of measure being graduated as from zero to 1.

The reverse side of my rule is graduated to scale zero, 1/16, 3/16, 5/16, 7/16 etc. up to 15/16 and then 1, the following unit of measure being similarly graduated. The opposite edge of the rule is graduated to scale zero, 1/64, 3/64, 5/64, 7/64, etc. up to 63/64 and then 1, the following unit of measure being also similarly graduated.

It will be noted that with a rule or scale that is graduated as described above, it is possible to scale any fractional dimension not smaller than a sixty-fourth. I have not illustrated any smaller fraction, as most work does not need to be scaled any closer than a sixty-fourth, as the decimal system is used for finer or more accurate scaling.

It will be plainly seen that my rule or scale permits the scaling of an odd fractional dimension such as 3/16, 3/32, or 3/64 of an inch with greater ease and accuracy, since the graduations on the scale for measuring such linear distances are respectively spaced apart 1/8, 1/16, 1/32 of an inch. For example, the machinist who is making use of this rule, can scale a fractional dimension of 5/64 of an inch or any other fraction in sixty-fourths, and can more accurately read the scale as the graduations are spaced 1/32 of an inch apart.

This simplified rule eliminates much of the confusion caused by exceedingly close graduations, and furthermore it may be noted that the workman is subjected to less eye strain than when he is using a rule, which has been graduated in the usual manner.

Although I have illustrated but one form of my invention, and have described in detail but a single application thereof, it will be apparent to those skilled in the art, that various modifications and changes may be made therein without departing from the spirit of my invention or from the scope of the appended claims.

I claim:

1. In a rule having a straight edge, a graduation spaced one-sixteenth of an inch from the end of the rule and a series of succeeding graduations each adjacent two being spaced one-eighth of an inch apart.

2. In a rule having a straight edge, a graduation spaced one-thirty-second of an inch from the end of the rule and a series of succeeding graduations each adjacent two being spaced one-sixteenth of an inch apart.

3. In a rule, a graduation spaced one-sixty-fourth of an inch from the end of the rule and a series of succeeding graduations each adjacent two being spaced one-thirty-second of an inch apart.

4. A rule having a straight edge, a graduation at the straight edge spaced from the end of the rule and a series of succeeding graduations along the straight edge of the rule each adjacent two being spaced apart twice the distance between the first graduation and the end of the rule.

5. In a rule, a graduation spaced from the end of the rule and a series of succeeding graduations each adjacent two being spaced apart twice the distance between the first graduation and the end of the rule.

LOUIS ROBIDOUX.